3,356,611
SILICATE LAYER MINERALS AND PRODUCTS
MADE THEREFROM
George Forbes Walker, Blackburn, Victoria, and William George Garrett, Ringwood, Victoria, Australia, assignors to Commonwealth Scientific and Industrial Research Organization, a body corporate of Australia
No Drawing. Filed July 13, 1964, Ser. No. 382,378
Claims priority, application Australia, July 12, 1963, 32,957/63
7 Claims. (Cl. 252—28)

This invention relates to organic modified vermiculite complexes and to processes for making same. The complexes are organophilic and readily dispersible in a wide variety of organic liquids to form stable suspensions.

The fact that vermiculites react with organic substances to form (a) molecular and (b) cationic complexes has long been known. In these complexes the organic substance is interlayered with the silicate layers of the vermiculite to form "sandwich" complexes or "adducts" in which the silicate layers alternate with layers of the organic substance.

Vermiculites are usually formed in nature by hydrothermal alteration of biotite or phlogopite micas although they may in some instances be derived from pyroxenic or hornblendic progenitors. Vermiculites are usually employed in industry after heating at a temperature in the region of 900° or 1000° C., which treatment causes a marked expansion or "exfoliation" of the minerals. The vermicular ("worm-like") product has a low bulk density which makes it valuable as a filler in light-weight concretes, for thermal and acoustic insulation, etc. So far only relatively very limited uses have been developed for vermiculites in the unexfoliated condition.

In our copending U.S. patent application Ser. No. 245,421, now Patent No. 3,325,340, a method is disclosed whereby, when certain organic substituted ammonium cations having between 3 and 6 carbon atoms, such as n-butylammonium, are introduced between the silicate layers of vermiculites and the resulting complexes are washed with water, they swell and become capable of being dispersed into extremely thin platelets and of forming stable suspensions in water by the application of mechanical shearing forces. These complexes however, do not swell in organic liquids, nor are they dispersible in such media. A method for treating vermiculites with organic cations, in order to produce complexes which are capable of forming comparable finely divided stable suspensions in both polar and non-polar organic liquids, has thus not been disclosed heretofore, but, in accordance with the procedures now disclosed, a completely or partly hydrophobic and organophilic product can now be made as required.

One of the objects of this invention, therefore, is to provide a process for the formation of organic-modified crystals of vermiculite minerals and for the conversion of the crystals into thin, sheet-like fragments held in suspension in an organic liquid or liquids.

Another object is to provide a vermiculite adduct which readily disperses in organic liquids and remains in suspension in such liquids.

A further object is to provide a suspension of an organc-modified vermiculite in an organic liquid which can be used to deposit films or coatings on surfaces by evaporation of the liquid.

Another object is to provide a finely divided organic-modified vermiculite suitable for incorporation into bodied lubricants including greases; a subsidiary object is to provide such bodied lubricants themselves.

Further and more specific objects of the present invention will become apparent from the following detailed description and examples.

Vermiculites may be defined as a macroscopic rock-forming trioctahedral mineral with a layer lattice structure, the chemical composition of which may be represented in the "idealized" form:

$$Mg_3^{VI}(Al,Si)_4^{IV}O_{10}(OH)_2 \cdot M^+_{0.5-0.9} \cdot 2-4.5\ H_2O$$

Octahedrally-coordinated magnesium (VI) within the silicate layers may be replaced in part by iron, nickel, aluminium and other atoms. The silicate layers carry a net negative charge due to isomorphous substitutions of aluminium for silicon in tetrahedral coordination (IV) within the layers. Electrical neutrality is preserved by the existence of the appropriate number of cations between adjacent silicate layers, i.e. in interlayer positions (these are represented as $M^+$ in the formula). In the naturally occurring minerals these cations are usually magnesium, calcium, sodium or hydrogen, although small amounts of other cations may also be present. The number of interlayer cations is defined by the cation exchange capacity of the minerals which, for different vermiculites, covers a range from about 115 milliequivalents to about 190 milliequivalents per 100 gms. Under natural conditions the amount of interlayer water depends on the interlayer cation present and also on the ambient temperature and humidity. It is often within, or close to, the range quoted in the formula.

It is however, to be understood that the term "vermiculite" as used herein also includes minerals containing a substantial proportion of vermiculite layers in intimate association with non-vermiculite layers, such as hydrobiotite and chlorite-vermiculite. In hydrobiotite, vermiculite layers are interleaved with an approximately equal number and often is an approximately regular alternation with mica layers, while in chlorite-vermiculite or vermiculite-chlorite, interleaving of vermiculite layers and chlorite layers in variable proportions occurs. These minerals which contain vermiculite layers will have exchange capacities which vary according to the ratio of vermiculite to non-vermiculite layers in the mineral. Thus the hydrobiotites have exchange capacities which may vary between 40 and 100 milli-equivalents per 100 grams of the mineral. However, the exchange capacities for such minerals, expressed in terms of the vermiculite layers in the mineral, are of the same order as those for vermiculite itself. Accordingly, vermiculite and the other minerals mentioned above will be referred to herein from time to time as "layer lattice minerals containing at least a substantial proportion of vermiculite layers" and the exchange capacities of these minerals will be expressed in terms of milli-equivalents per 100 grams of the vermiculite layers in such minerals. Vermiculites, as defined above and which have been treated according to any of the processes described in our copending U.S. patent application Ser. No. 245,421, may also be used in accordance with the present invention; such pre-treated vermiculites may be in the form of treated crystals swollen by immersion in water or dispersed flakes produced by mechanical disintegration of such swollen crystals.

The invention also provides modified crystalline layer lattice minerals produced by the above-defined process and dispersions of such modified minerals in organic liquid media.

The chemical substances which are useful in the practice of this invention include salts of organic cations, for example, substituted ammonium, phosphonium or sulphonium cations. These cations may be primary, secondary, tertiary or quaternary and the substituting groups may be saturated or unsaturated aliphatic chains, polyoxyethylene chains or aromatic or heterocyclic rings or any combination of two or more of these substituents.

The optimum composition of the organic cation depends on the polarity of the organic liquid in which the treated vermiculite is subsequently to be dispersed. The size and structure (i.e. shape) of the organic cation is of prime importance since this controls the proportion of the total silicate surface covered and the proportion remaining uncovered. In general, the more polar the liquid, the smaller the size of organic cation required to form a complex which is capable of giving a satisfactory dispersion in that liquid i.e., the lower the proportion of the total silicate surface which must be covered by the cations. The size and shape of the cation are related to the number of carbon atoms and to their configuration in space. In general terms, for a given number of carbon atoms, quaternary cations tend to have more covering power than tertiary, tertiary more than secondary and secondary more than primary cations. When both these factors (viz. number of carbon atoms and molecular configuration) are taken into account, an estimate of the covering power of a given cation can be obtained.

Generally primary cations having a single aliphatic substituent should contain at least six carbon atoms, as complexes formed from similar cations of shorter chain length tend to disperse well in aqueous media but not to any marked degree in even the more polar organic solvents, e.g. butylammonium and isoamylammonium vermiculites. With secondary, tertiary and quaternary cations, the vermiculite complexes exhibit improved swelling in organic liquids as the degree of substitution of the onium cation increases, but in general the same lower limit to the total number of carbon atoms present applies as in the case of primary cations. Large cations, e.g. cetylpyridinium, or cetyltrimethylammonium, are the most effective for producing vermiculites which are dispersible in non-polar organic liquids, such as toluene or petroleum ethers, but become increasingly less effective as the polarity of the dispersion medium increases. Contrariwise, the use of small cations, e.g. n-hexylammonium results in good dispersibility in methanol and other highly polar organic solvents, but very poor dispersibility in toluene or petroleum ethers.

With decreasing polarity of the dispersion liquid the proportion of surface covered by the organic cation is increased until the surfaces are completely covered and some degree of over-lapping exists. As the size of the cation is increased, however, beyond a certain value, a tendency to mutual interference by adjacent cations develops which prevents a proportion of the cations approaching sufficiently closely to the surfaces of the silicate layers for ionic bonding to occur. As a consequence other surfaces of the silicate layers retain in their vicinity a proportion of non-exchanged hydrophilic cations and are less effectively covered with organophilic groups, showing again some resemblance in their properties to complexes in which the organic cation is too small to cover the mineral surface completely, in that they do not swell in non-polar organic liquids. Furthermore, in more polar organic liquids, the oleophilic nature of the large organic cations produces a surface which is sufficiently incompatible with the liquid to again inhibit swelling and dispersion. Calculations indicate that the area of surface available per monovalent cation in vermiculite ranges from about 105 to about 65 square angstrom units (corresponding to a range of cation exchange capacity from 115 milliequivalents to 190 milliequivalents per 100 grams). If the cation exchange capacity of the vermiculite to be treated is known, therefore, an organic cation with covering power less than, equal to or greater than the area per charge can be selected as required. However, all the examples cited refer to a vermiculite with a cation exchange capacity of 130 milliequivalents per 100 g.

Specific examples of substituted ammonium cations which are suitable for coating the vermiculite surfaces are: n-hexylammonium, n-dodecylammonium, n-octadecylammonium, n-octadecenylammonium, methyloctadecylammonium, dimethyloctadecylammonium, cetyltrimethylammonium, cetylpyridinium and the cation formed from "Ethomeen 18/20" (a tertiary amine with one octadecyl group and two polyoxyethylene groups, together totalling 10 oxyethylene units; made by the Armour Industrial Chemical Co., Ill., U.S.A.). Mixtures of two or more organic cations may be used. An example of a mixture which is of value is cetyltrimethylammonium plus benzidine.

In addition to the effect of the size and shape of the organic cation, the quantity of cation added also affects the degree of surface coverage obtained. In general, optimum coverage and hence satisfactory dispersibility occurs when the amount of cation added approximates the exchange capacity of the mineral, too small a quantity of cation giving rise to areas with unexchanged hydrophilic cations; while too large an amount of cation leads to adsorption of excess neutral organic cation salt oriented in such a way that the hydrophilic portion of the cation and its anion is exposed. However, in certain instances e.g. where the cation originally present in the vermiculite can only be displaced with difficulty, it is often advantageous to add more than the equivalent amount of organic cation. Example 4 illustrates this point. Here magnesium cations are not as readily displaced by the cetyl pyridinium ions as are lithium cations and hence the degree of dispersion in the hydrocarbon oil is reduced. The use of slightly more cetyl pyridinium salt in the magnesium vermiculite case leads to better dispersion in the oil. A second instance where deviation from the use of the precise amount of organic cation salt equivalent to the exchange capacity arises is in the case of the less polar liquids where slightly less organic cation may assist dispersion and gelling.

In any of the preferred embodiments of the invention, the essential procedure involved in preparing vermiculite-organic complexes of the type required consists in treating a known amount of the mineral at a certain temperature and for a certain interval of time with an aqueous solution of the salt bearing the appropriate organic cation. Three general procedures which fall within the scope of the invention may be used, namely:

(a) Refluxing the macroscopic crystals of raw vermiculite for several hours with an aqueous solution containing the organic cation;

(b) Adding an aqueous solution containing the organic cation either at room temperature or at some elevated temperature to macroscopic vermiculite crystals already saturated with n-butylammonium or other suitable cation and swollen by washing with water as described in our copending United States patent application Ser. No. 245,421, and (c) Adding a solution containing the organic cation to an aqueous dispersion of vermiculite produced in accordance with out copending United States patent application Ser. No. 245,421, by previously saturating vermiculite with n-butylammonium or other suitable cation, washing in water until macroscopic swelling has occurred and subjecting the product to shearing forces in a colloid mill or other suitable apparatus. In this instance, addition of the solution containing the organic cation may be made at room temperature to the aqueous dispersion of vermiculite whereupon immediate flocculation is observed to occur.

The best method to be applied in a given instance depends on the particular cation to be used, and in some instances, all three methods give equally effective products as regards subsequent dispersion in organic liquids. In other instances, method (c) gives a superior final product. Where applicable, method (a) will often be preferred in commercial practice since costs of manufacture are likely to be minimised.

In procedures (b) and (c), n-butylammonium has been given as the example of an organic cation which can be used for pretreatment of the vermiculite. In our copending U.S. patent application Ser. No. 245,421, already referred to, it has been noted that, in certain vermiculites although not all, the inorganic cation lithium can also be used in place of n-butylammonium, etc., in order to produce the same type of macroscopic swelling in aqueous solution. Where the lithium treatment is appropriate, its use may offer some advantage in that only approximately stoichiometric amounts (that is, the quantity required to satisfy the cation exchange capacity of the mineral) of any of the organic cations to be used in accordance with the present invention need be added to the system.

After preparation according to one of the three general methods outlined, the vermiculite-organic complex is removed from the aqueous medium by decantation, centrifugation or filtration and dried at room temperature or at some elevated temperature not exceeding about 60° C. Subsequent dispersion in an organic liquid may occur spontaneously to some extent on immersion but is usually achieved by a combination of milling and heating in the presence of the appropriate liquid.

| Organic Liquid | Organic cation adsorbed on vermiculite | Sedimentation volume in ml. (after 24 hrs.) |
|---|---|---|
| Petroleum ether (100°–120°). | Cetylpyridinium | 85 |
| | Cetyltrimethylammonium | 80 |
| Toluene+1% methanol | Cetyltrimethylammonium | 31 |
| | Cetyltrimethylammonium/ octadecylammonium, 50/50. | 36 |
| | Cetylpyridinium | 36 |
| | Dimethyloctadecylammonium | 28 |
| | "Ethomeen 18/20" cation | 45 |
| Toluene+1% meshanol+0.5% benzidine. | Dimethyloctadecylammonium | 65 |
| Dibutylphthalate | Cetyltrimethylammonium | 10 |
| Methylethylketone | Octadecylammonium | 91 |
| | Octadecenylammonium | 84 |
| | Methyloctadecylammonium | 86 |
| | Dimethyloctadecylammonium | 12 |
| | Dodecylammonium | 90 |
| | Cetyltrimethylammonium/ octadecylammonium, 20.80. | 56 |
| Cellosolve | Dodecylammonium | 10 |
| | Octadecylammonium | 16.5 |
| Methanol | Dodecylammonium | 9 |
| | Hexylammonium | 73 |

By way of illustration, typical examples of sedimentation volumes have been shown in the foregoing table. The values of sedimentation volume quoted in the table are not to be taken as maxima but simply as demonstrating that a considerable degree of dispersion has been achieved. One gram of the vermiculite-organic complex was added in each instance to 100 ml. of the organic liquid specified and the mixture milled until dispersion occurred. The product was transferred to a measuring cylinder and the reading given in the table was taken after the mixture had remained undisturbed for 24 hours.

Example 1

100 g. raw vermiculite of 44–72 B.S.S. mesh size, and having a cation exchange capacity of 130 milliequivalents per 100 g., was added to 5 litres of an aqueous solution containing 61.4 g. of cetylpyridinium bromide and the mixture refluxed for 3 hours. After cooling the complex was washed three times with water, by decantation, and dried at 50° C. Dispersion of the product in petroleum ether was effected by grinding in a ball mill for 80 minutes.

Example 2

To a 4% aqueous suspension of lithium-vermiculite containing 100 g. of vermiculite, prepared according to the method in our copending U.S. patent application Ser. No. 245,421, 5 litres of solution containing 50.0 g. of cetyl pyridinium bromide was added at room temperature with stirring. A precipitate resembling "cotton wool" formed immediately and in filtering and air-drying the product, a friable powder was obtained. Dispersion of 20 g. of the powder in 300 ml. of an S.A.E. 30 solvent-refined mineral oil, (viscosity Index 50) was effected by passing once through a colloid mill (rotor-stator clearance=3/1000″). The grease formed in this way had a 60 strokes worked penetration [1] of 195 mm.×$10^{-1}$ at 77° F.

Example 3

100 g. of raw vermiculite of 44–72 B.S.S. mesh size and having a cation exchange capacity of 130 milliequivalents per 100 g., was added to 5 litres of aqueous solution containing 38.5 g. of cetyl pyridinium bromide and the mixture refluxed for 6 hours. After cooling, the complex was washed three times with water by decantation, and air-dried. 30 gm. of the product was dispersed in 300 ml. of a S.A.E. 30 solvent-refined mineral oil (V.I. 50) by milling in a ball mill. The grease formed in this way gave a IP 50/59 penetration value at 77° F. of 286 mm.×$10^{-1}$ (worked 60 strokes).

Example 4

100 g. samples of raw vermiculite of 44–72 B.S.S. mesh size, and having a cation exchange capacity of 130 milliequivalents per 100 g., were added to 5 litres of aqueous solution containing the appropriate quantities of chloride salt to convert the vermiculite completely to either the lithium, magnesium or butylammonium forms (100 g. of LiCl, 200 g. of $MgCl_2 \cdot 6H_2O$ or 25 g. of $C_4H_9NH_3Cl$). After refluxing for six hours the products were washed three times with absolute alcohol and to each was added 5 litres of a solution containing 38.5 g. of cetyl pyridinium brodime. After a further six hours refluxing, the products were washed three times with water and allowed to dry in the air. 30 gm. of each was then dispersed in 300 ml. of the solvent-refined oil as described in Example 3. The IP 50/59 penetration values of the resulting greases after working 60 strokes are given in Table I.

TABLE I

| Cation: | Penetration mm.×$10^{-1}$ |
|---|---|
| Lithium | 240 |
| Magnesium | 350 |
| Butylammonium | 250 |

Example 5

To a 4% aqueous suspension of lithium-vermiculite containing 100 g. of vermiculite prepared according to the method in our copending United States patent application Ser. No. 245,421, 5 litres of a solution containing 47.4 g. of cetyl trimethylammonium bromide was added at room temperature with stirring. The precipitate formed was filtered, washed by redispersion in water and dried. A grease prepared by dispersion of 20 g. of this complex in 300 ml. of an S.A.E. 30 solvent-refined mineral oil (V.I.=95) using a ball mill gave a 60-stroke worked IP 50/59 penetration value of 342 mm.×$10^{-1}$.

Example 6

To a 4% aqueous dispersion of n-butylammonium-vermiculite, produced in accordance with the method in our copending U.S. patent application Ser. No. 245,421, and containing 100 g. of vermiculite, 5 litres of a solution containing 53.8 g. of cetyl pyridinium bromide was added with stirring. The precipitate was filtered and washed twice by redispersion in water and allowed to air-dry. 30 g. of the powder was moistened with 15 ml. of acetone, and dispersed in 300 ml. of and S.A.E. 30 naphthenic oil (V.I.=9) by stirring and then passing once through a colloid mill (rotor-stator clearance=3/1000″). The grease formed in this way had a 60 stroke IP 50/59 penetration value of 335 mm.×$10^{-1}$.

[1] Penetration of grease and petrolatum—Institute of Petroleum Standard 50/59.

Example 7

100 g. of 44–72 B.S.S. mesh lithium vermiculite, swollen according to the method in our copending U.S. patent application Ser. No. 245,421 but not dispersed in water, was added to 5 litres of water containing 58.2 g. of cetyltrimethylammonium bromide and shaken at room temperature for 24 hours. The supernatant solution was decanted and the complex dried at room temperature. To disperse the product, 10 g. was ground in a ball mill with 10 ml. of methanol for 5 minutes. 1 litre of toluene was added and milling continued for a further 80 minutes, by which time a satisfactory dispersion had been produced.

Example 8

To a 4% aqueous dispersion of n-butylammonium-vermiculite (cation exchange capacity 130 milliequivalents per 100 g.), produced in accordance with the method in our copending U.S. patent application Ser. No. 245,421 and containing 43.1 g. of butylammonium-vermiculite, a solution containing 43.1 g. of octadecylamine and 160 ml. of 3.6% hydrochloric acid in 5 litres of water was added with stirring. After decanting the supernatant liquid, the precipitate was dried at room temperature. Dispersion in methyl ethyl ketone was effected by milling for 40 minutes.

Example 9

To a 4% aqueous dispersion of n-butylammonium-vermiculite (cation exchange capacity 130 milliequivalents per 100 g.), produced in accordance with the method in our copending U.S. patent application Ser. No. 245,421 and containing 100 g. of butylammonium-vermiculite, a solution containing 127.8 g. of "Ethomeen 18/20" and 180 ml. of 3.6% hydrochloric acid in 5 litres of water was added with stirring. After decanting the liquid, the precipitate was washed twice with water, and dried at 60° C. 1 g. of the product was dispersed in toluene-methanol mixture as described in Example 8.

If a vermiculite organic complex, dispersed in an organic liquid as described herein, is applied to a surface and the vehicle allowed to evaporate a uniform coating consisting of the complex is formed. Coatings of this kind may be stripped from a suitable surface to yield coherent self-supporting flexible films with valuable properties, for example, as electrcial insulators. The formation of such a film is described in the following example.

Example 10

To a 4% aqueous suspension of lithium-vermiculite containing 100 g. of vermiculite, prepared according to the method in our copending U.S. patent application Ser. No. 245,421 was added with stirring 5 litres of a solution containing 58.2 gm. of "Ethomeen 0/15" and 120 ml. of 3.6% hydrochloric acid. The flocculant product was filtered, washed twice with water and dried at 50° C. 30 g. of this product was ball-milled with 270 ml. of a commercial petroleum solvent for 85 minutes. This suspension was then poured onto a porous ceramic tile which had been previously wetted with glycerol and the solvent allowed to evaporate. The coherent film obtained by this procedure could be readily removed from the tile.

The organic liquid dispersions produced according to the present invention, moreover, may be mixed in various proportions with other organic and inorganic substances without deleterious effect to the stability of the dispersion. These mixed dispersions may be applied to surfaces to form, after evaporation of the volatile constituents, coatings with desirable properties. Examples of such organic substances are lacquers and resins, and examples of inorganic substances are metallic powders and mineral fibres. Colored pigments may also be added to the dispersions. These additives are incorporated in the dispersions so as to produce modifications in the appearance and properties of the coatings. Moreover, coatings may be stripped from smooth surfaces to yield coherent, self-supporting films, flexible or inflexible as required.

The organic liquid dispersions produced according to the present invention are also thixotropic and may be used as additives to suspensions to prevent settling, for example, paint additives or to control the rheological properties of a product, for example, adhesives or printing inks.

It is to be understood that the present invention includes any such dispersions, coatings and films and methods for their formation which fall within the spirit and scope of said invention.

We claim:

1. A process for the modification of a crystalline layer lattice mineral containing at least a substantial proportion of vermiculite layers to enhance the dispersibility of the mineral in an organic liquid, which process comprises the step of exchanging at least a major proportion of the cations present in the said vermiculite layers with an organic cation selected from the group comprising substituted ammonium, phosphonium and sulphonium cations having substituent groups selected from saturated and unsaturated aliphatic chains containing a total of not less than 6 carbon atoms, polyoxyethylene chains and aromatic and heterocyclic rings; the said cation when so exchanged being capable of promoting gross swelling of the crystalline mineral in a direction normal to the main cleavage plane of the mineral crystals during immersion of the crystals in an organic liquid subsequent to the exchange of said cations, wherein the cations of the mineral which are to be exchanged have previously been replaced by a cation capable of promoting gross swelling of the crystalline mineral in a direction normal to the main cleavage plane of the mineral during immersion of the crystals in water subsequent to said replacement.

2. A process for the production of a grease containing a crystalline layer lattice mineral produced from a natural crystalline layer lattice mineral containing at least a substantial proportion of vermiculite layers, said layers having an effective exchange capacity of about 115 to 190 milli-equivalents of a monovalent cation per 100 grams of the layers, which process comprises the steps of exchanging a proportion of the cations present in the said vermiculite layers with an organic cation by treating the said mineral with an aqueous solution containing the organic cation in an amount equivalent to about 0.7 to 1.3 times the said exchange capacity; said organic cation being selected from the group comprising substituted ammonium, phosphonium and sulphonium cations having substituent groups selected from saturated and unsaturated aliphatic chains containing not less than 6 carbon atoms, polyoxyethylene chains and aromatic and heterocyclic rings; the said cation being capable of promoting gross swelling of the crystalline mineral in a direction normal to the main cleavage plane of the mineral crystals during immersion of the crystals in an organic liquid subsequent to the exchange of said cations; drying the mineral subsequent to the exchange of said cations, immersing the dried mineral in an oil of lubricating viscosity, and subjecting the mineral whilst immersed in the said oil to mechanical disintegration.

3. The process claimed in claim 2, wherein the said mineral is selected from the group comprising vermiculite, hydrobiotite and chlorite-vermiculite.

4. The process claimed in claim 1, wherein the mineral, the cations of which are to be exchanged, is in the form of an aqueous dispersion produced by previously saturating the vermiculite layers of the mineral with a cation capable of promoting gross swelling of the crystalline mineral in a direction normal to the main cleavage plane of the mineral during immersion of the crystals in water subsequent to said replacement, washing the thus saturated mineral in water until macroscopic swelling has occurred and subjecting the product to shearing forces; and in which to the mineral dispersion thus obtained is added a solution containing the said cation.

5. A suspension of modified crystalline layer lattice lubricating oil, said mineral containing at least a substantial proportion of vermiculite layers and capable of being dispersed in a liquid organic medium in which at least a major proportion of the interlayer cations normally present in the vermiculite layers of the natural crystalline mineral have been replaced by an organic cation selected from the group comprising substituted ammonium, phosphonium and sulphonium cations having substituent groups selected from saturated and unsaturated aliphatic chains containing a total of not less than 6 carbon atoms, polyoxyethylene chains and aromatic and heterocyclic rings; the said cation being capable of promoting gross swelling of the crystalline mineral in a direction normal to the main cleavage plane of the mineral crystals during immersion of the crystals in an organic liquid subsequent to the exchange of said cations.

6. A suspension of a finely divided crystalline layer lattice mineral containing at least a substantial proportion of vermiculite layers in an organic liquid medium produced by subjecting the modified mineral made by the process of claim 1 to mechanical disintegration while immersed in the liquid organic medium.

7. A grease comprising a dispersion, in an oil of lubricating viscosity, of the modified mineral made by the process of claim 1, which is present in an amount of from 2% to 30% by weight of said oil.

References Cited

UNITED STATES PATENTS

| | | | |
|---|---|---|---|
| 2,154,664 | 4/1939 | Carswell et al. | 252—28 |
| 2,155,981 | 4/1939 | Schmidt | 252—28 |
| 2,266,636 | 12/1941 | Hauser | 161—206 |
| 2,831,809 | 4/1958 | Peterson | 252—25 |

OTHER REFERENCES

"Swelling of Some Vermiculite-Organic Complexes in Water" by Garrett et al., Pergamon Press, New York, July 6, 1962, pp. 557–567.

DANIEL E. WYMAN, *Primary Examiner.*

I. VAUGHN, *Assistant Examiner.*